US012695207B2

(12) United States Patent　　(10) Patent No.:　US 12,695,207 B2
Erdogan et al.　　(45) Date of Patent:　　Jul. 28, 2026

(54) PROTECTIVE STRUCTURE

(71) Applicant: TUSAS—TURK HAVACILIK VE UZAY SANAYII ANONIM SIRKETI, Kahramankazan/Ankara (TR)

(72) Inventors: Nursev Erdogan, Kahramankazan/Ankara (TR); Nail Bugra Kilic, Kahramankazan/Ankara (TR); Anil Kuban, Kahramankazan/Ankara (TR); Aziz Taner Astarlioglu, Kahramankazan/Ankara (TR)

(73) Assignee: TUSAS—TURK HAVCILIK VE UZAY SANYII ANONIM SIRKETI, Kahramankazan/Ankara (TR)

( * ) Notice: Subject to any disclaimer, the term of this patent is extended or adjusted under 35 U.S.C. 154(b) by 264 days.

(21) Appl. No.: 18/711,078

(22) PCT Filed: Oct. 26, 2022

(86) PCT No.: PCT/TR2022/051183
§ 371 (c)(1),
(2) Date: May 16, 2024

(87) PCT Pub. No.: WO2023/096610
PCT Pub. Date: Jun. 1, 2023

(65) Prior Publication Data
US 2025/0030173 A1　　Jan. 23, 2025

(30) Foreign Application Priority Data
Nov. 24, 2021　(TR) ................................ 2021/018347

(51) Int. Cl.
*H01Q 17/00*　　(2006.01)
*B64C 1/06*　　(2006.01)
*B64C 1/00*　　(2006.01)

(52) U.S. Cl.
CPC ........... *H01Q 17/008* (2013.01); *B64C 1/068* (2013.01); *B64C 2001/0054* (2013.01)

(58) Field of Classification Search
CPC .... H01Q 17/008; H01Q 15/14; H01Q 17/007; B64C 1/068; B64C 2001/0054; F41H 11/00; F41J 2/00
See application file for complete search history.

(56) References Cited

U.S. PATENT DOCUMENTS 8,067,996 B2 * 11/2011 Hillman .................... H01P 1/10
333/263
10,444,417 B2 10/2019 Lam
(Continued)

FOREIGN PATENT DOCUMENTS

| CN | 211607245 U | 9/2020 |
| CN | 112292014 A | 1/2021 |
| WO | 2004037447 A1 | 5/2004 |

OTHER PUBLICATIONS

International Search Report and Written Opinion for PCT application No. PCT/TR2022/051183, mailed Feb. 28, 2023.
(Continued)

*Primary Examiner* — Yonghong Li
(74) *Attorney, Agent, or Firm* — Notaro, Michalos & Zaccaria P.C.

(57) ABSTRACT

At least one protective layer made of vanadium oxide is located on a body of an air and/or space vehicle. The protective layer has conductive or insulating properties at a temperature predetermined by the user.

14 Claims, 1 Drawing Sheet

(56)                    References Cited

U.S. PATENT DOCUMENTS

| | | | |
|---|---|---|---|
| 11,387,566 B2 * | 7/2022 | Ukei ..................... | B32B 27/304 |
| 2015/0042502 A1 * | 2/2015 | Gorriti Gonzalez ........................ | |
| | | | H01Q 17/002 |
| | | | 427/9 |
| 2019/0269048 A1 * | 8/2019 | Fujita ..................... | H01F 1/117 |
| 2021/0194147 A1 * | 6/2021 | Nagano ................ | B32B 15/085 |

OTHER PUBLICATIONS

Sep. 14, 2023 Demand for Chapter II for PCT application No. PCT/TR2022/051183 with claim amendments, dated Sep. 14, 2023. International Preliminary Report on Patentability for PCT application No. PCT/TR2022/051183, mailed Oct. 16, 2023.

* cited by examiner

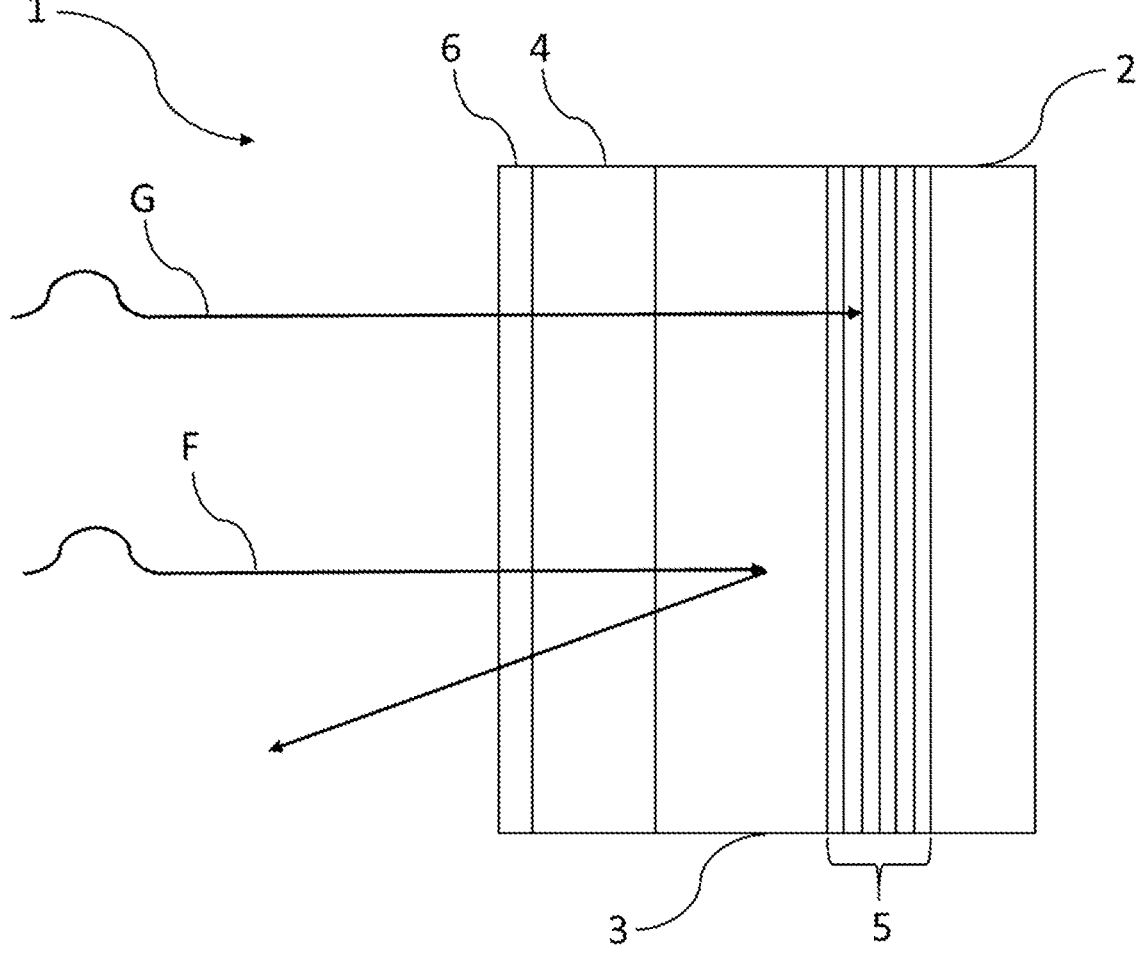

PROTECTIVE STRUCTURE

The present invention relates to a protective structure created to prevent electromagnetic waves, which are emitted for locating and attacking an air vehicle, from reaching the air vehicle surface.

Attacks with radar locating waves or lightning strikes require the air vehicle to ensure security and take precautions. Electromagnetic waves arriving at the air vehicle surface are in the form of a periodically recurring structure, and are fully or partially transmitted or reflected back, depending on the design of the material. Another important security factor is the identification of threats by the air vehicle and the collection of data about targeting and signal intelligence. Electronic warfare is to detect and block emitted signals using electromagnetic energy in order to follow operational planning. Built-in or external protection systems are provided on the air vehicle for the protection of emitted waves in case of an electronic warfare.

The United States patent document U.S. Pat. No. 10,444, 417, which is included in the known-state of the art, discloses an optical limiter used to prevent electromagnetic waves that may damage sensors and equipment in the air vehicle. This document explains that waves with a certain frequency value can be reflected back using an optical limiter. It also discloses that a photocathode a material configured to be triggered for a phase transition, and power units are used, and that a tungsten is provided in the structure of the material triggered for phase transition. It discloses the use of metal for the transmission of electrons transmitted from the power unit and the creation of apertures in the architecture inside the device to strengthen the electric field formed.

The other patent document CN112292014A, which is included in the known-state of the art, discloses a microwave transmission pass band adjustable high-transmittance light window based on a phase change material and graphene, and belongs to the field of optical transparent electromagnetic shielding and microwave communication. The high-transmittance electromagnetic shielding light window is composed of a patterned graphene layer, a transparent dielectric layer and a frequency selective surface layer of an integrated phase-change material, wherein the frequency selective surface layer of the integrated phase-change material and the patterned graphene layer are arranged on the two sides of the transparent dielectric layer in parallel respectively.

The other utility model document CN211607245U, which is included in the known-state of the art, discloses a low-frequency shielding heat-conducting composite structure, which comprises a single-sided release layer, a graphite layer, a low-frequency shielding layer and a protective film layer which are arranged in sequence, wherein the layers are bonded together in sequence; wherein the low frequency shielding layer is made of permalloy, ferrite sheet or ferrite polymer.

The other patent document WO2004037447A1, which is included in the known-state of the art, discloses electromagnetic-interference-absorbing thermally-conductive gap filler, such as an elastomeric (for example, silicone) pad treated with an electromagnetic-interference-absorbing material. In application, a layer of thermally conductive EMI-absorbing material is applied between an electronic device or component, and a heat sink.

Thanks to a protective structure according to the present invention, radar visibility of the air vehicle is reduced and electronic warfare waves are reflected back through a single structure.

Thanks to a protective structure according to the present invention, a multi-functional coating is applied on the air vehicle, and the air vehicle is protected against electronic warfare.

The protective structure realized to achieve the object of the invention, which is defined in the first claim and other claims dependent thereon, comprises at least one body constituting an air vehicle that is a manned and/or unmanned aircraft; at least one protective layer located on the body, which is conductive against electromagnetic waves that can be directed to the air vehicle at temperatures lower than phase transformation temperature, and which is insulating against electromagnetic waves that can be directed to the air vehicle at temperatures higher than the phase change temperature. The protective layer is made of vanadium dioxide (VO2).

The protective structure according to the invention comprises at least one magnetic layer which is coated on the protective layer with an impedance value predetermined by the user, wherein if warfare waves directed to damage the air vehicle equals to the impedance value predetermined by the user, the magnetic layer absorbs the warfare waves almost completely on itself and is heated by high resonance frequency and magnetic resonance created, so that it allows temperature of the protective layer to increase as a result of its heating and transforms the protective layer into a conductive phase by exceeding the phase change temperature.

In an embodiment of the invention, the protective structure, creates a low resonance frequency due to radar waves directed for locating the air and/or space vehicle are at least partially absorbed on the magnetic layer. Accordingly, the magnetic layer cannot heat the protective layer enough to provide the phase change temperature predetermined by the user, and the protective layer keeps its insulating form such that it is transparent for incoming waves. Radar waves passing through the protective layer are absorbed by at least one radar absorbing layer (RAM) positioned between the protective layer and the body.

In an embodiment of the invention, the protective structure comprises the magnetic layer which has a surface resistance predetermined by the user to be higher than a surface resistance of the protective layer, thus increasing the capacity to absorb the electromagnetic waves thereon.

In an embodiment of the invention, the protective structure comprises the magnetic layer which is heated as a result of the resonance frequency formed by absorbing the electromagnetic waves transmitted thereon, and which allows the protective layer to be triggered directly without a need for any other power source, so that the protective layer reaches the phase transformation temperature and is transformed into a conductive phase with metallic properties.

In an embodiment of the invention, the protective structure comprises the protective layer which is located on the body forming an outer surface of the air vehicle, so as to surround an area where the electronic equipment in the air vehicle are located.

In an embodiment of the invention, the protective structure comprises the magnetic layer located on the protective layer and for which impedance value can be changed according to a thickness predetermined by the user.

In an embodiment of the invention, the protective structure comprises the protective layer doped with silicon (Si), thus reducing the transition temperature from the monoclinic phase, which has insulating properties, to the rutile phase, which has conductive properties.

In an embodiment of the invention, the protective structure comprises a radar absorbing layer, which is coated on the body using a spraying method.

In an embodiment of the invention, the protective structure comprises the protective layer, which is coated on the radar absorbing layer using the spraying method.

In an embodiment of the invention, the protective structure comprises the magnetic layer, which is coated on the protective layer using the spraying method.

In an embodiment of the invention, the protective structure comprises at least one polymer layer applied on the magnetic layer using a spray coating method, which substantially protects the magnetic layer against factors such as humidity and/or friction to which it may be exposed.

In an embodiment of the invention, the protective structure comprises the magnetic layer in hexa ferrite structure made of barium ferrite ($BaFe_{12}O_{19}$), manganese ferrite ($MnFe_2O_4$), cobalt ferrite ($CoFe_2O_4$), nickel ferrite ($NiFe_2O_4$), copper ferrite ($CuFe_2O_4$) or zinc ferrite ($ZnFe_2O_4$).

In an embodiment of the invention, the protective structure comprises the radar absorbing layer made of indium tin oxide ($InSnO_2$) or zinc tin oxide ($ZnSnO_3$).

In an embodiment of the invention, the protective structure comprises the body to which warfare waves in a range of intensity or wavelength predetermined by the user are directed.

In an embodiment of the invention, the protective structure comprises the body to which radar waves in a range of intensity or wavelength predetermined by the user are directed.

The protective layer realized to achieve the object of the present invention is illustrated in the attached drawings, in which:

FIG. 1 is a schematic view of the protective structure.

All the parts illustrated in FIGURES are individually assigned a reference numeral and the corresponding terms of these numbers are listed below:

1. Protective Structure
2. Body
3. Protective Layer
4. Magnetic Layer
5. Radar Absorbing Layer
6. Polymer Layer
(F) Warfare Waves
(G) Radar Waves The protective structure (1) comprises a body (2) which is an air and/or space vehicle; at least one protective layer (3) made of vanadium oxide ($VO_2$), which is located on the body (2) and has conductive or insulating properties at a temperature predetermined by the user.

The protective structure (1) according to the invention comprises at least one magnetic layer (4) which is coated on the protective layer (3) with an impedance value predetermined by the user, wherein if warfare waves (F) directed to the body (2) for an attack is almost equal, the magnetic layer (4) substantially absorbs the warfare waves (F) and is heated by high resonance frequency, thus increasing a temperature of the protective layer (3) and rendering it a conductive structure, so that the warfare waves (F) are reflected back from the protective layer (3) (FIG. 1).

There is provided the protective layer (3) located on the body (2) that is an outer surface of the air and/or space vehicle, wherein the protective layer (3) acts as an insulator or conductor at a temperature below the phase change temperature, allowing the directed electromagnetic waves to pass through to reach the body (2), wherein the protective layer (3) exhibits conductive behavior at a temperature above the phase change temperature, allowing directed electromagnetic waves to be reflected back.

The magnetic layer (4), for which the impedance value is predetermined by the user, is coated on the protective layer (3). In case the warfare waves (F) directed to the body (2) for an electronic attack have almost equal impedance with the magnetic layer (4), the directed warfare waves (F) are substantially absorbed on the magnetic layer (4). As a result of absorbing the warfare waves (F) substantially, the magnetic layer (4) heats up as a result of the resonance frequency and magnetic resonance formed on the magnetic layer (4), and causes the temperature of the protective layer (3) to increase. When the phase transformation temperature of the protective layer (3) predetermined by the user is exceeded, it is transformed into a conductive phase, so that warfare waves (F) from the magnetic layer (4) are reflected back before they reach the body (2). Thanks to the protective layer (3) transformed into the conductive phase, electromagnetic warfare waves (F) directed to the air vehicle can be reflected back before they reach the body.

In an embodiment of the invention, the protective structure (1) comprises at least one radar absorbing layer (5) located between the body (2) and the protective layer (3), wherein when the radar waves (G), which are directed at the air and/or space vehicle with an impedance value lower than the impedance of the magnetic layer (4) predetermined by the user, are at least partially absorbed on the magnetic layer (4) and create the low resonance frequency, the radar absorbing layer (5) allows the protective layer (3) to act as an insulator by remaining under the temperature predetermined by the user, and allows the radar waves (G) passing through the protective layer (3) to be substantially absorbed. Radar waves (G) sent to the air and/or space vehicle for locating, and for which the impedance value is lower than the impedance value of the magnetic layer (4) predetermined by the user, are at least partially absorbed on the magnetic layer (4). However, since the low resonance frequency occurs as a result of this, the protective layer (3) cannot reach the required temperature to perform the conversion from the insulating phase to the conductive phase, and since the protective layer (3) is in the insulating phase, it acts transparently against radar waves (G). Radar waves (G) passing through the protective layer (3) are absorbed on the radar absorbing layer (5) before they reach the body (2).

In an embodiment of the invention, the protective structure (1) comprises the magnetic layer (4) located on the protective layer (3) with a surface resistance value predetermined by the user that is higher than the surface resistance of the protective layer (3), thus obtaining a capacity increase in absorbing electromagnetic waves. The magnetic layer (4) has a surface resistance predetermined by the user, which is higher than the surface resistance of the protective layer (3) on which it is located. In this way, the absorbing capacity of the magnetic layer (4) is increased.

In an embodiment of the invention, the protective structure (1) comprises the magnetic layer (4) with a hexagonal ferrite structure, which heats up as a result of electromagnetic waves absorbed thereon and allows the protective layer (3) to be triggered directly such that the protective layer (3) is transformed into a conductive phase. Temperature of the magnetic layer (4) increases with the resonance frequency formed as a result of absorbing the warfare waves (F) on the magnetic layer (4). Therefore, temperature of the protective layer (3) also increases and phase transformation takes place. The phase transformation occurring on the protective layer (3) is triggered only and directly by the heating of the magnetic layer (4).

In an embodiment of the invention, the protective structure (1) comprises the protective layer (3) located on a surface of the body (2) that substantially surrounds the electronic equipment inside the air vehicle. Avionic equipment and/or computer equipment in the air vehicle may be affected by warfare waves (F). Warfare waves (F) can be prevented by the protective layer (3) located on the body (2), which substantially surrounds the areas containing the electronic equipment of the air vehicle.

In an embodiment of the invention, the protective structure (1) comprises the magnetic layer (4) located on the protective layer (3) with a thickness predetermined by the user in order to determine the magnetic impedance value. Impedance value of the magnetic layer (4) is determined by changing its thickness according to the impedance value of the warfare waves (F) to which it may be exposed.

In an embodiment of the invention, the protective structure (1) comprises the protective layer (3) which is doped with silicone, thus reducing the transition temperature from the monoclinic phase to the rutile phase. If the protective layer (3) made of vanadium dioxide is doped with silicone, transition temperature from the monoclinic phase to the rutile phase decreases, wherein the protective layer (3) is insulative in the monolithic phase, and conductive in the rutile phase. Therefore, the heat required for the phase transition of the protective layer (3) decreases, since its temperature is increased by being triggered as a result of the heating of the magnetic layer (4).

In an embodiment of the invention, the protective structure (1) comprises the radar absorbing layer (5) coated on the body (2) using the spraying method. The radar absorbing layer (5) can preferably be coated on the body (2) using the spray coating method.

In an embodiment of the invention, the protective structure (1) comprises the protective layer (3) which is coated on the radar absorbing layer (5) using the spraying method. The protective layer (3) can be coated on the radar absorbing layer (5), preferably using the spray coating method.

In an embodiment of the invention, the protective structure (1) comprises the magnetic layer (4) which is coated on the protective layer (3) using the spraying method. The magnetic layer (4) can be coated on the protective layer (3), preferably using the spray coating method.

In an embodiment of the invention, the protective structure (1) comprises at least one polymer layer (6) coated on the magnetic layer (4) using the spray coating method, which allows the magnetic layer (4) to be protected against factors such as humidity and/or friction. Thanks to the polymer layer (6), the magnetic layer (4) is prevented from being heated due to friction, and efficiency of the magnetic layer (4) can be prevented from decreasing due to other external factors such as humidity.

In one embodiment of the invention, the protective structure (1) comprises the magnetic layer (4) made of barium ferrite, manganese ferrite, cobalt ferrite, nickel ferrite, copper ferrite or zinc ferrite. Thanks to the magnetic layer made of magnetic materials contained in the hexaferrite group, the resonance frequency capacity is increased.

In an embodiment of the present invention, the protective structure (1) comprises the radar absorbing layer (5) made of indium tin oxide or zinc tin oxide. The radar absorbing layer (5) can preferably be doped with graphene, graphene oxide and/or carbon nanotube (CNT).

In an embodiment of the present invention, the protective structure (1) comprises the body (2) to which warfare waves (F) with an intensity or wavelength predetermined by the user are directed. The impedance value of the magnetic layer (4) can be determined according to the intensity or wavelength of the warfare waves (F) predetermined by the user.

In an embodiment of the invention, the protective structure (1) comprises the body (2) to which radar waves (G) with an intensity and wavelength predetermined by the user are directed. The impedance value of the magnetic layer (4) can be determined according to the intensity or wavelength of the radar waves (G) predetermined by the user.

The invention claimed is:

1. A protective structure (1) comprising:
   a body (2) which is an air and/or space vehicle;
   at least one protective layer (3) made of vanadium oxide (VO2) located on the body (2) and has conductive or insulating properties at a temperature predetermined by a user;
   at least one magnetic layer (4) coated on the protective layer (3) with an impedance value predetermined by the user, wherein when warfare waves (F) directed to the body (2) for an attack is almost equal to the impedance value predetermined by the user, the magnetic layer (4) substantially absorbs the warfare waves (F) and is heated by high resonance frequency, thus increasing a temperature of the protective layer (3) and rendering it a conductive structure, so that the warfare waves (F) are reflected back from the protective layer (3); and
   at least one radar absorbing layer (5) located between the body (2) and the protective layer (3), wherein when radar waves (G) are directed at the air and/or space vehicle with an impedance value lower than the impedance value of the magnetic layer (4) predetermined by the user, are at least partially absorbed on the magnetic layer (4) and create a low resonance frequency, the radar absorbing layer (5) allows the protective layer (3) to act as an insulator by remaining under the temperature predetermined by the user, and allows the radar waves (G) passing through the protective layer (3) to be substantially absorbed.

2. A protective structure (1) according to claim 1, wherein the magnetic layer (4) located on the protective layer (3) has a surface resistance value predetermined by the user that is higher than the surface resistance value of the protective layer (3), thus obtaining a capacity increase in absorbing electromagnetic waves.

3. A protective structure (1) according to claim 1, wherein the magnetic layer (4) has a hexagonal ferrite structure, which heats up as a result of electromagnetic waves absorbed thereon and allows the protective layer (3) to be triggered directly such that the protective layer (3) is transformed into a conductive phase.

4. A protective structure (1) according claim 1, wherein the protective layer (3) located on a surface of the body (2) substantially surrounds electronic equipment inside the air vehicle.

5. A protective structure (1) according claim 1, wherein the magnetic layer (4) located on the protective layer (3) has a thickness predetermined by the user in order to determine the impedance value of the magnetic layer (4).

6. A protective structure (1) according claim 1, wherein the protective layer (3) is doped with silicone, thus reducing a transition temperature from a monoclinic phase to a rutile phase.

7. A protective structure (1) according to claim 1, wherein the radar absorbing layer (5) is coated on the body (2) using a spraying method.

8. A protective structure (1) according to claim 1, wherein the protective layer (3) is coated on the radar absorbing layer (5) using a spraying method.

9. A protective structure (1) according claim 1, wherein the magnetic layer (4) is coated on the protective layer (3) using a spraying method.

10. A protective structure (1) according claim 1, comprising at least one polymer layer (6) coated on the magnetic layer (4) using a spray coating method which allows the magnetic layer (4) to be protected against factors such as humidity and/or friction.

11. A protective structure (1) according claim 1, wherein the magnetic layer (4) is made of barium ferrite, manganese ferrite, cobalt ferrite, nickel ferrite, copper ferrite or zinc ferrite.

12. A protective structure (1) according to claim 1, wherein the radar absorbing layer (5) is made of indium tin oxide or zinc tin oxide.

13. A protective structure (1) according claim 1, wherein the body (2) to which warfare waves (F) with an intensity or wavelength predetermined by the user are directed.

14. A protective structure (1) according claim 1, wherein the body (2) to which radar waves (G) with an intensity and wavelength predetermined by the user are directed.

\* \* \* \* \*